United States Patent

[11] 3,609,095

[72] Inventor Brian S. Wyatt
 Deep River, Ontario, Canada
[21] Appl. No. 801,809
[22] Filed Feb. 24, 1969
[45] Patented Sept. 28, 1971
[73] Assignee Atomic Energy of Canada Limited
 Ottawa, Ontario, Canada

[54] URANIUM DIOXIDE ARTICLE AND METHOD OF PRODUCING THE SAME
7 Claims, No Drawings

[52] U.S. Cl..................................................... 252/301.1,
 23/344, 23/355, 264/0.5
[51] Int. Cl........................................................ C09k 3/00
[50] Field of Search........................................... 252/301.1;
 23/344, 346, 355; 264/0.5

[56] References Cited
UNITED STATES PATENTS
3,354,044 11/1967 Robertson.................. 252/301.1 X

OTHER REFERENCES

Marin, J. F. et al. Nuc. Sci. Abstracts, Vol. 23, No. 17, 34100, p. 3514.

Mateke, Hs., Nuc. Sci. Abstracts, Vol. 23, No. 17, 34101, p. 3514.

Primary Examiner—Carl D. Quarforth
Assistant Examiner—R. L. Tate
Attorney—Weir, Marshall, MacRae & Lamb ABSTRACT: The invention relates to the production of uranium dioxide articles such as nuclear fuel elements and ceramic shapes and which comprise a powdered mixture of $UO_{2+x}$ and U or Pu metal, wherein X is the amount of excess $O_2$ required to produce, from said mixture, stoichiometric $UO_2$ when subjected to reaction conditions under irradiation.

One of the problems incidental to the use of nuclear fuel elements containing vibration packed mixtures of uranium dioxide ($UO_2$) powders is the shrinkage of the $UO_2$ that occurs at the high temperatures generated in the fuel element during irradiation. The maximum packed densities thus far obtained in nuclear fuel elements, made by vibration packing inside a metal sheath a mixture of different size fractions of $UO_2$ powders, are in the range of 88–92 percent of the theoretical density. The $UO_2$ powder is commonly prepared by crushing previously sintered or fused blocks of $UO_2$. During irradiation of such an element, the $UO_2$ powder tends to sinter with resultant shrinkage of the $UO_2$ body. This shrinkage could impair heat transfer between fuel and sheath and might eventually result in the collapse of the fuel-sheathing when this is insufficiently thick to be self-supporting in the reactor coolant pressure.

URANIUM DIOXIDE ARTICLE AND METHOD OF PRODUCING THE SAME

The present invention seeks to provide a uranium dioxide article containing a body of $UO_2$ which is not subject to shrinkage under sintering conditions.

The invention may be said to reside in the production of a ceramic shape of fuel element comprising a mixture of hyperstoichiometric uranium dioxide ($UO_{2+x}$) and uranium (U), or plutonium (Pu) metal powders wherein X is the amount of excess $O_2$ required to produce, from the mixture, stoichiometric of near-stoichiometric $UO_2$.

The invention may also be said to reside in a method of producing a uranium dioxide article which comprises providing $U_{2+x}$, e.g., by oxidizing $UO_2$ to produce $UO_{2+x}$, and preparing a mixture of powders of said $UO_{2+x}$ and U or Pu metal wherein the amounts of excess $O_2$ represented by X and said metal are such as to produce from said mixture stoichiometric $UO_2$ on subjection to reaction temperatures, i.e., temperatures within the range 600–1200° C.

The invention is based upon the possibility of equilibrating mixtures of $UO_{2+x}$ and uranium or plutonium metal to obtain stoichiometric or near stoichiometric $UO_2$. This reaction would result in an increase in the actual solid volume of the mixture and counteract shrinkage.

In accordance with the invention, therefore, a mixture of $UO_2$ and uranium or plutonium metal powders is formed, such mixture having incorporated therein sufficient excess oxygen to produce a stoichiometric or near-stoichiometric mixture. While theoretically the excess oxygen could be added by either oxidizing the $UO_2$ or adding oxygen to the mixture by some other means, this invention proposes to incorporate the oxygen in combined form in the matrix by oxidizing the $UO_2$ since free oxygen would tend to diffuse more readily into the sheathing material in which the mixture may be vibration packed. The O/U ratio in the $UO_{2+x}$ would ordinarily be in the range of about 2.01 to 2.30. The uranium metal in the mixture comprises about 3–12 percent thereof.

Assuming, for instance, that the $UO_2$ has been oxidized to a composition of $UO_{2.25}$, the proportion of uranium metal (U) to uranium oxide ($UO_2$) in the mixture should be such that:

|  | $8UO_{2.25}$ | + | U | $\rightarrow$ | $9UO_2$ |
|---|---|---|---|---|---|
| Weight g. | 2192 |  | 238 |  | 2430 |
| Vol. cm.³ | 196.5 |  | 12.5 |  | 222 |

As indicated, an initial volume of 209 cm.³ of $U+UO_{2.25}$ would swell to 222 cm.³ on equilibration, when the U content of the initial mixture was 9.8 wt. percent. The theoretical density of the $UO_2/U$ mixture would be about 10 percent higher than that of stoichiometric $UO_2$. Thus, it is possible, using the same vibratory compaction process, to pack the powder mixture to about 5–10 percent higher density than stoichiometric $UO_2$ and, with some restraint, prevent swelling on equilibration.

The mixture of $UO_{2+x}$ and U metal powders is prepared in conventional particle-size ranges and, as nuclear fuel elements, is vibration packed in metal sheaths to a density of about 9.7–10.96 g./cc. in the usual manner to form the fuel elements.

When fused $UO_2$ is used, it is crushed to an appropriate range of sieve sizes to achieve effective vibration packing.

Experiments to equilibrate U and $UO_{2+x}$ at 800° C. and 1,000° C. to make stoichiometric mixtures have shown that the initial U is converted to $UO_2$ and increases in volume, while becoming metallurgically bonded to the initial $UO_{2+x}$ substrate. These experiments have also shown that because of the increase in volume accompanying the reaction, there is no tendency for the $UO_2$ product to shrink away from the sheathing wall in fuel elements.

The invention may also be applied to the production of large complex ceramic shapes of $UO_2$ where shrinkage during sintering would produce unacceptable distortion in the finished article. In this case, the reaction would be utilized to counteract shrinkage during sintering. A mixture of the $U/UO_{2+x}$ powder can be vibration packed in a container of, for instance, Mo or Mo-lined graphite, then annealed in an inert atmosphere at a suitable temperature to equilibrate the U and $UO_{2+x}$. In this manner, coherent compacts may be produced to required dimensions with avoidance of the problem of shrinkage and attendant dimensional control in their fabrication.

I claim:

1. An article comprising a compacted mixture of powders of uranium dioxide containing excess oxygen ($UO_{2+x}$) and uranium (U) or plutonium (Pu) metal, wherein X is the amount of excess oxygen required to produce from said mixture, when the latter is subjected to an elevated temperature at which reaction occurs, stoichiometric uranium dioxide and, when plutonium is present in said compacted mixture, stoichiometric plutonium dioxide.

2. An article as claimed in claim 1, including a sheath wherein said mixture is vibration packed to a density in the range of 9.70 to 10.96 g./cc.

3. An article as claimed in claim 1, wherein the O/U ratio in said $UO_{2+x}$ is in the range of 2.01 to 2.30.

4. An article as claimed in claim 1, wherein said U or Pu metal constitutes from 3 to 12 percent by weight of said compacted mixture.

5. A method of producing an article which comprises compacting a mixture of powders of $UO_{2+x}$ and U or Pu metal, wherein X is the amount of excess oxygen required to produce from said mixture, when the latter is subjected to an elevated temperature at which reaction occurs, stoichiometric uranium dioxide and, when plutonium is present in said compacted mixture, stoichiometric plutonium dioxide.

6. A method according to claim 5, wherein said mixture is compacted into a container.

7. A method according to claim 5, including the step of vibration packing said mixture in a sheath to a density in the range from 9.70 to 10.96 g./cc.